United States Patent
Schultz et al.

[11] Patent Number: 5,992,696
[45] Date of Patent: Nov. 30, 1999

[54] MANIFOLD FOR A METERING CYLINDER

[75] Inventors: Nicolo S. Schultz, Plymouth; William C. Paetow, Pinckney, both of Mich.

[73] Assignee: Sealant Equipment & Engineering, Inc., Plymouth, Mich.

[21] Appl. No.: 09/028,900

[22] Filed: Feb. 24, 1998

[51] Int. Cl.⁶ .................................................. B67D 5/62
[52] U.S. Cl. ...................... 222/146.2; 417/537; 60/456; 222/146.4; 222/249
[58] Field of Search ..................... 417/505, 537; 60/456; 222/249, 253, 146.2, 146.4

[56] References Cited

U.S. PATENT DOCUMENTS

| | | | |
|---|---|---|---|
| 1,202,153 | 10/1916 | Black | 417/537 |
| 1,805,609 | 5/1931 | Wilson . | |
| 1,935,150 | 11/1933 | Fox et al. | 184/7 |
| 2,331,070 | 10/1943 | Farque | 417/537 X |
| 2,752,862 | 7/1956 | Boakes, 2nd | 417/537 X |
| 2,862,653 | 12/1958 | Shapiro | 417/505 X |
| 3,292,824 | 12/1966 | Arp et al. | 222/250 |
| 3,370,759 | 2/1968 | Johansson | 222/249 |
| 3,653,783 | 4/1972 | Sauder | 417/505 X |
| 3,791,212 | 2/1974 | Blackburn et al. | 222/249 X |
| 4,180,090 | 12/1979 | Bemba | 222/249 X |
| 4,297,083 | 10/1981 | Von Petery | 417/505 X |
| 4,575,313 | 3/1986 | Rao et al. | 417/505 X |
| 4,688,609 | 8/1987 | Diaz | 222/146.2 X |
| 5,509,575 | 4/1996 | Gillette | 222/1 |
| 5,524,797 | 6/1996 | Schultz, Sr. | 222/334 |
| 5,556,007 | 9/1996 | Breitsprecher | 222/249 X |

Primary Examiner—Kenneth Bomberg
Attorney, Agent, or Firm—Young & Basile, P.C.

[57] ABSTRACT

A manifold for a double acting metering cylinder having a fluid tight reciprocal piston forming a pair of expandable and retractable chambers, the manifold having a housing with passageways therein and directional valves to selectively deliver fluid material to the first chamber while delivering fluid material away from the second chamber during a forward stroke of the piston and delivering fluid material to the second chamber while delivering fluid material away from the first chamber during a return stroke of the piston.

19 Claims, 4 Drawing Sheets

MANIFOLD FOR A METERING CYLINDER

FIELD OF THE INVENTION

The present invention relates to a manifold for dispensing fluid to a metering cylinder.

BACKGROUND OF THE INVENTION

In many chemical operations and in various other industries, including liquid injection molding, metering viscous materials in predetermined quantities is a required procedure. As required by these procedures, the viscous material must be metered continuously at a steady rate. To accommodate the need for a continuous flow to the dispensing unit, double acting meters or dual meters are provided. To feed and regulate the meter or meters, extensive valving, temperature controllers and conduits from the material source as well as to the dispensing units may be required. This may result in a cumbersome package. In the case of a reciprocal metering cylinder having a continuous flow stream to a dispensing unit, it is desirable to provide a manifold for housing the conduits and valves in a single package that provides pressure controlled flow to the cylinder meter as well as temperature control of the fluid.

SUMMARY OF THE INVENTION

A reciprocating metering cylinder is operatively connected to a drive unit. The metering cylinder has a piston therein forming two chambers within the cylinder housing. The cylinder has apertures proximate to each end of the cylinder housing for access to and from the two chambers. The reciprocating movement of the piston within the cylinder housing alternates between a charging and discharging of fluid into the chambers. As one chamber is discharging, the other chamber is filling. Therefore, with every stroke of the piston, a measured quantity is being discharged to a dispensing unit. The reciprocating meter is controlled by a servo motor that controls the dispense rate and dispense pressure during operation. The dispensing process is controlled by a robot controller to closely link the dispensing process to the robot motion. A computer determines the position of the piston in the cylinder via the pressure monitored by pressure transducers. The pressure transducers are integrated into a manifold along with the conduits and valving necessary for the function of the double acting metering cylinder.

The manifold assembly is positioned adjacent to the metering cylinder. Fluid flow is controlled by four injector valves mounted in the manifold. The pressure transducers are mounted in the manifold between the injector valves and the meter. The transducers provide pressure feedback to the robot controller.

The valving in the metering cylinder provides fluid flow control for three modes of operation. The three modes include dispensing in an A direction, dispensing in a B direction and repositioning the metering cylinder.

The manifold further includes a water manifold within the main manifold housing for dispensing water to a heating jacket around the metering cylinder to maintain a constant temperature throughout operation of the assembly. In summary, the manifold provides a single housing for containing the necessary conduits and valves to operate the metering cylinder.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
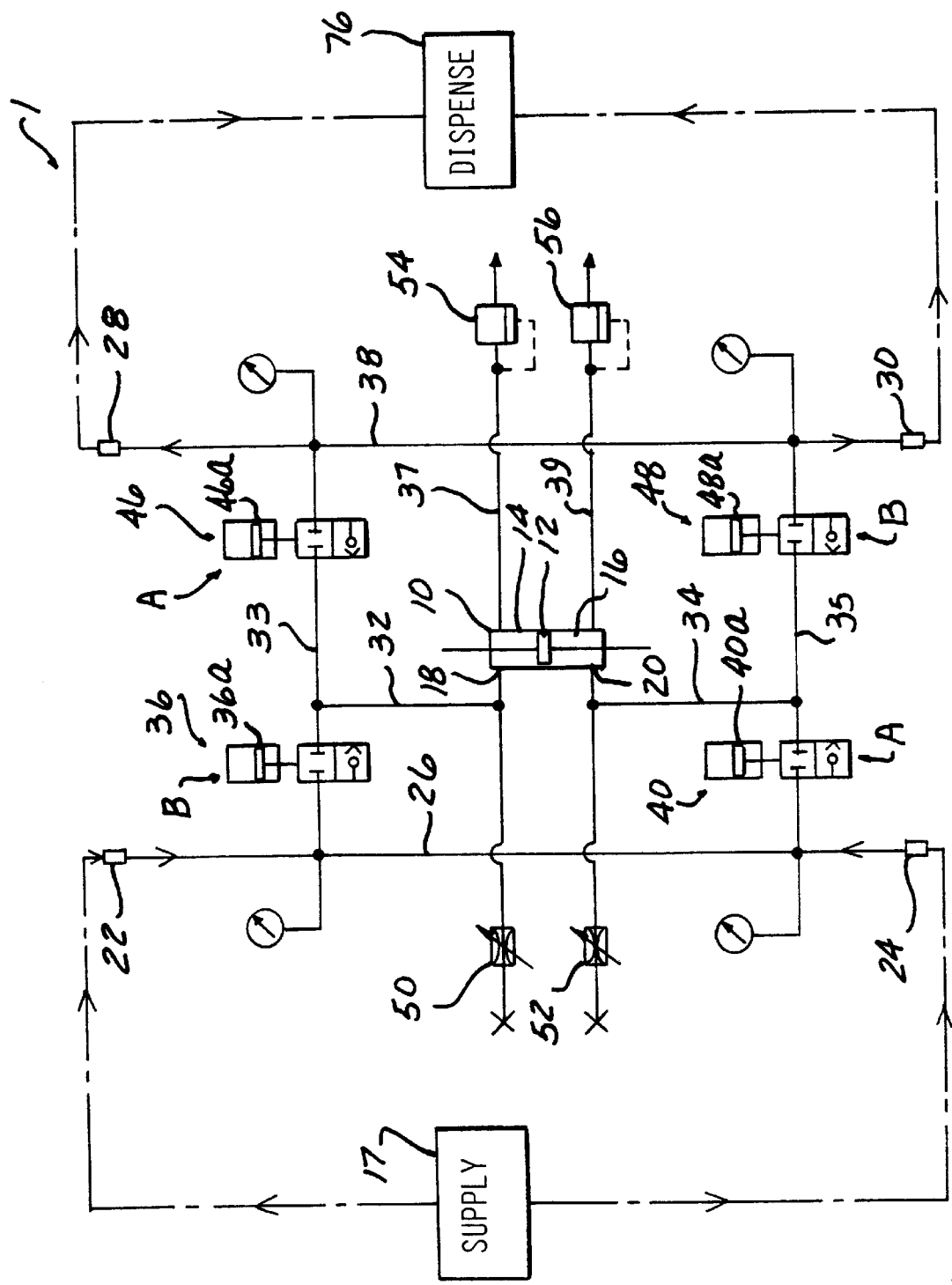
FIG. 1 is a schematic illustration of the manifold and the connection to a reciprocating metering cylinder.

FIG. 1 shows a schematic of the manifold 1 and its connection to a double acting or reciprocating metering cylinder designated generally as 10. The metering cylinder includes a reciprocatingly moving piston 12 therein to form a pair of chambers 14, 16. Each first and second chamber 14, 16 has an access port 18, 20 respectively. The manifold 1 communicates to both chambers 14, 16 of the metering cylinder 10. The manifold 1 includes a pair of inlet ports 22, 24 which have a continuous channel 26 therebetween to communicate with each other. The manifold 1 further includes a pair of outlet ports 28, 30 configured similarly as the inlet ports 22, 24 such that the pair of outlet ports 28, 30 have a second continuous channel 38 therebetween. Generally, only one input port and one outlet port will be used at any one time. The purpose of having a pair of inlet and outlet ports is to provide a convenient entering or hookup point for the adhesive or other fluid material into the manifold 1 depending upon the application and location of the material supply source 17. The material inlet ports 22, 24 communicate with the first chamber 14 of the metering cylinder 10 by way of a conduit 32 that connects to the access port 18 of the first chamber 14. Conduit 32 communicates with both of the inlet ports 22, 24 and outlet ports 28, 30 via conduit 33. A directional inlet valve 36 is disposed in conduit 33 between the inlet ports 22, 24 of the manifold 1 and the access port 18 of the first chamber 14. The inlet port 22, 24 also communicate to the access port 20 of the second chamber 16 of the metering cylinder 10 via conduit 34. Conduit 34 communicates with both the inlet ports 22, 24 and outlet ports 28, 30 via conduit 35. Disposed in the conduit 34 between the inlet ports 22, 24 of the manifold 1 and the access port 20 of the second chamber 16 of the metering cylinder 10 is another directional inlet valve 40.

The access ports 18, 20 of the first and second chambers 14, 16 of the metering cylinder 10 each communicate to the outlet ports 28, 30 of the manifold 1. A directional outlet valve 46 is disposed in conduit 33 between the access port 18 of the first chamber 14 and the outlet ports 28, 30 of the manifold 1. A second directional outlet valve 48 in conduit 35 is disposed between the access port 20 of the second chamber 16 of the metering cylinder 10 and the material outlet ports 28, 30 of the manifold 1. The manifold 1 further includes a pair of bleed valves 50, 52 communicating with each access port 18 and 20 respectively to the metering cylinder. The bleed valves 50, 52 provide a means for priming the system and to remove any air pockets therein. The manifold 1 further includes a pair of pressure relief valves 54, 56 to maintain the system below a predetermined pressure level. Should the pressure in the metering cylinder 20 rise beyond a predetermined pressure, in which for the illustrated embodiment the preferred value is approximately 4000 psi, the relief valves 54 and/or 56 would open to permit fluid to flow through conduits 37 and/or 39 to a sump or back to the supply reservoir 17. Relief valve 54 monitors chamber 14 while relief valve 56 monitors chamber 16. Transducers 58 and 60 also provide a signal to the controller of the actual pressure within chambers 14 and 16 respectively.

Figure 2:
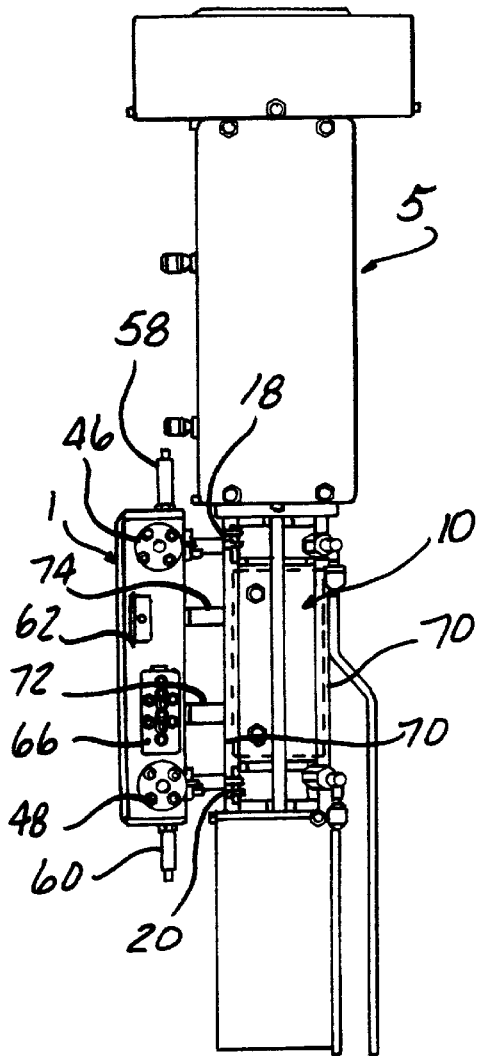
FIG. 2 is a side view of the manifold and its position relative to the meting cylinder.
Figure 4:
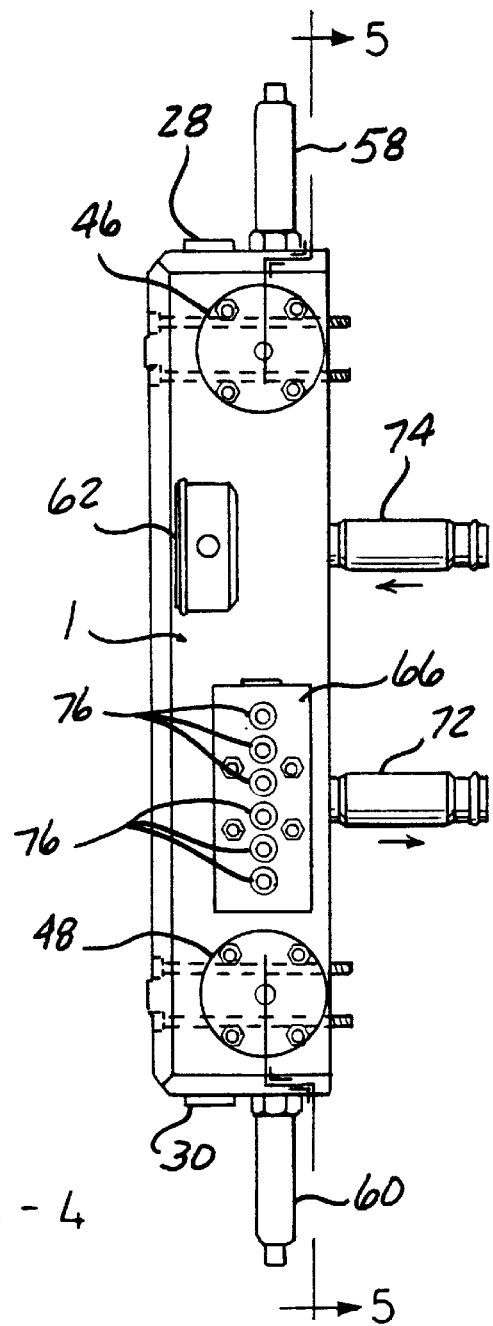
FIG. 4 is a side view of the manifold.
Figure 3:
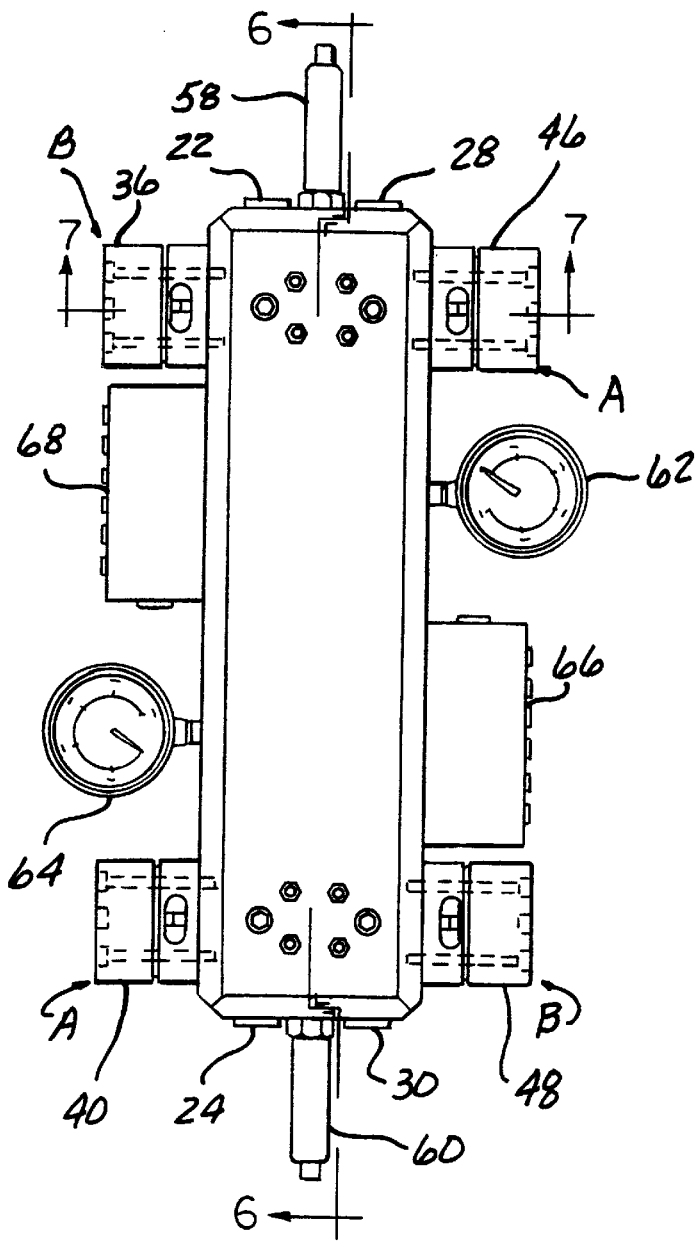
FIG. 3 is a plan view of the manifold.
Figure 6:
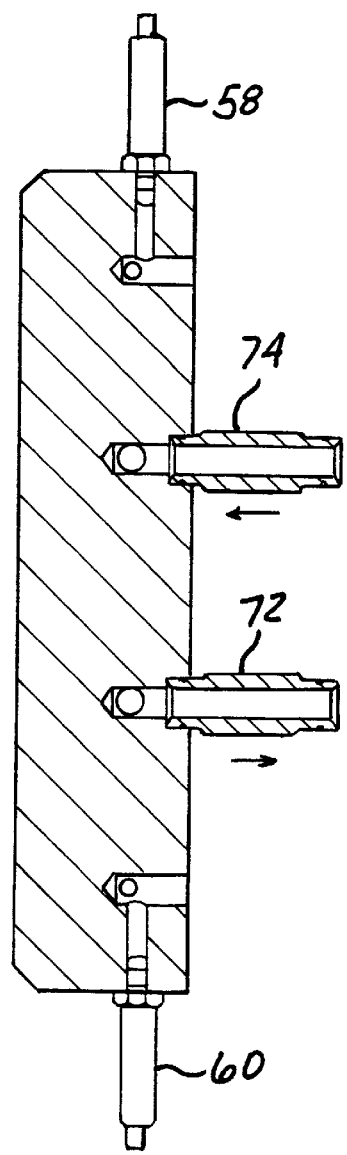
FIG. 6 is a sectional view of the manifold taken along lines 6—6 of FIG. 3.
Figure 7:
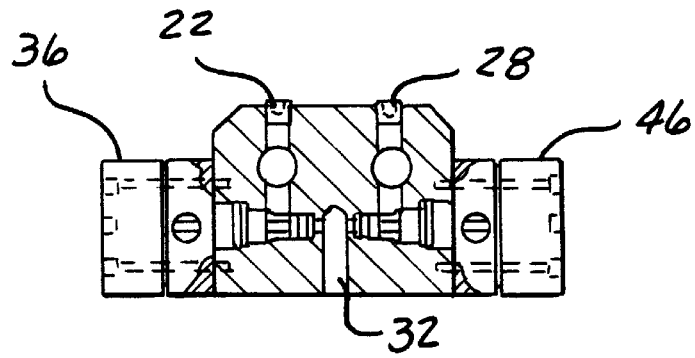
FIG. 7 is a sectional view of the manifold taken along lines 7—7 of FIG. 3.
Figure 5:
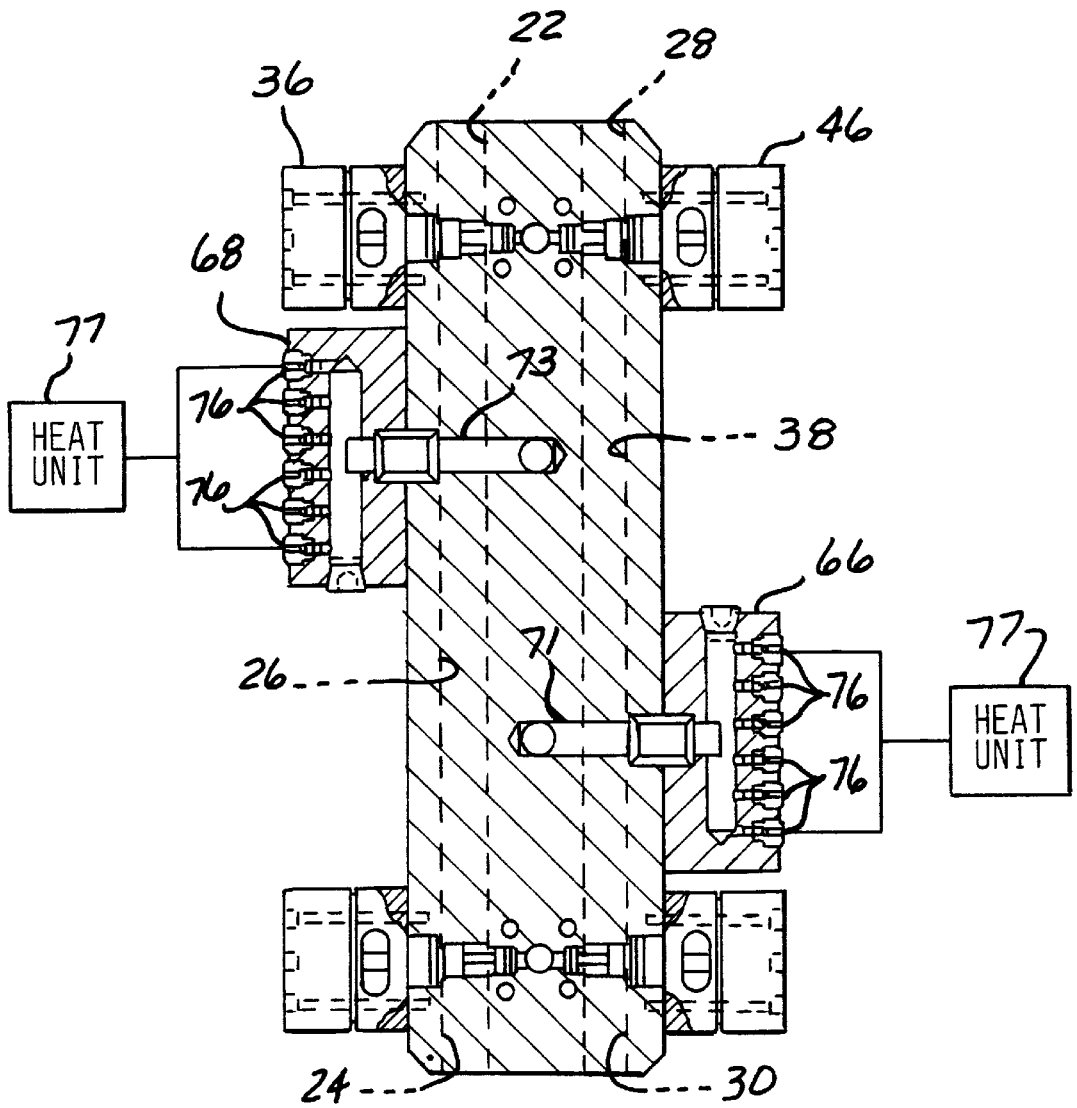
FIG. 5 is a sectional view of the manifold taken along lines 5—5 of FIG. 4.

FIGS. 2 through 4 show plan and side views of the illustrated manifold 1. FIG. 2 also shows the location of manifold 1 relative to the metering cylinder 10. FIGS. 5–7 show sectional view of the manifold 1. The manifold 1 provides a housing for containing the four directional valves, the pressure relief valves and bleed valves in a single unit. As discussed further, manifold 1 also houses water manifolds 66 and 68 for distributing heated fluid to the metering cylinder 10. As shown in FIG. 3, visual pressure gauges 62, 64 may be installed in line with the pressure transducers 58 and 60 respectively for a visual readout of the pressure of the fluid in the chambers 14 and 16 at any given time.

In addition, a pair of water manifolds 66 and 68 are provided to distribute the recirculation of temperature controlled water to and from the metering cylinder 10. The water manifolds 66 and 68 would be advantageous for cylinders having an exterior water jacket 70 or a water jacket incorporated into the design of the metering cylinder 10. There are two water manifolds 66 and 68 built into the main manifold 1; and both water manifold have ports 76 connectible to the temperature control device 77. The temperature control device 77 may be a heating unit that allows the water to circulate therethrough while heating to a predetermined temperature. The first water manifold 66 is plumbed so that water flows from the temperature control device 77 into ports 76 of the water manifold 66 and through the main manifold 1 via conduit 71 (FIG. 5). Conduit 71 meets conduit 72 (FIG. 4) which communicates with water jacket 70. Heated water or other fluid enters the water jacket 70 through conduit 72. A second water manifold 68 is integrated into the main manifold 1 having water outlet ports 76 for connecting to the temperature control device 77 for returning heated water to the temperature control device 74.

Heated water leaves the water jackets through conduit 74. Conduit 74 meets conduit 73 at an intersection in the main manifold 1. The water enters the water manifold 68 and is distributed to the ports 76 that are connected to return water to the temperature control device 77.

Each water manifold 66 and 68 as shown in FIGS. 4 and 5 include six water outlet/inlet ports 76 which uses commonly available water inlet taps. The quantity of the illustrated embodiment is preferably six to transport the needed or required volume of temperature regulated water to and from the water jacket 70. The quantity and size of the inlet and outlet ports 76 may vary for the application and availability of these components.

The metering cylinder 10 is operatively connected to a drive unit 5. For operation, the manifold 1 is pneumatically controlled such that when the piston 12 ascends within the cylinder to contract first chamber 14, directional inlet valve 40 and directional outlet valve 46 are energized to open. These valves hereinafter will be referred to as the A-directional valves. The other directional valves 36 and 48 remain closed. When the piston 12 is descending and thereby contracting the second chamber 16 and expanding the first chamber 14, the A-directional valves 40 and 46 are closed while inlet valve 36 and outlet valve 48 are energized to open. Inlet valve 36 and outlet valve 48 are hereinafter referred to as the B-directional valves. In operation, pneumatically operated solenoids 36a, 40a, 46a and 48a energize or de-energize the respective A and B directional valves. Material enters the manifold from the supply container 17 through either or both inlet ports 22 and 24. The inlet port 22, 24 that is utilized is dependent upon the location of the supply container 17 relative to the location of the manifold 1 and is simply a matter of convenience. When the piston 12 is descending, the first chamber 14 is expanding while the second chamber 16 is contracting. During this process, the solenoids 36a and 48a are energized. The B-directional valves 36 and 48 are opened while the A-directional valves 40 and 46 are closed. The fluid material from the supply container will flow through inlets 22 or 24 into common channel 26 and through the B-directional inlet valve 36. Since the A-directional outlet valve 46 is closed, the fluid material is forced through conduit 32 and into access port 18 of the cylinder such that it fills the first chamber 14 while the piston 12 is retracting second chamber 16. The fluid material in second chamber 16 exits through access port 20 into conduit 34. Since the A-directional inlet valve 40 is closed, the fluid material is forced through the B-directional outlet valve 48 into the common channel 38 that runs between outlet ports 28 and 30. From channel 38 the material will flow through the open outlet port 28 or 30 to the appropriate dispensing unit 76.

When the piston 12 begins to ascend within metering cylinder 10, the pneumatically controlled solenoids 36a and 48a close the B-directional valves; and the pneumatically controlled solenoids 40a and 46a open the A-directional valves. Material fluid will enter the manifold 1 from the supply source 17 through inlet port 22 or 24, into conduit 26 and then conduit 35, through A-directional inlet valve 40, through conduit 34 and into the second chamber 16 of the cylinder 10 via the access port 20. As the second chamber 16 is expanding, the first chamber 14 is retracting and expelling the fluid material contents in a metered fashion therefrom. The fluid material exits the first chamber 14 through access port 18 and flows through conduit 32. Because the B-directional inlet valve 36 is now closed, the fluid material is forced through the A-directional outlet valve 46 and into channel 38. The fluid material may then be sent to the dispensing unit 26 through the opened port 28 or 30. Either outlet port 28 or outlet port 30 may be open for access to the dispensing unit 76. The determination of which outlet port is opened to the dispensing unit is merely for convenience and location of the manifold 1 relative to the dispensing unit 76.

Overload relief valves 54 and 56 are operatively connected to the first chamber 14 and second chamber 16 respectively. If an overload condition occurs within either chamber of the metering cylinder 10, the appropriate relief valve 54 and/or 56 will vent fluid to an outside source, which may include the supply source. In the example of a system, relief valve 54 and 56 may be set at 4000 psi.

The single component manifold 1 of the present invention provides a compact system that is also aesthetic. The manifold integrates all of the valving and most of the conduits into the single unit to provide material savings. The manifold further provides a safety device by minimizing exterior conduits to the metering cylinder.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for delivering fluid material to a double acting metering cylinder, the metering cylinder having a fluid tight reciprocal piston forming an upper and lower expandable and contractible chamber in the cylinder, said apparatus comprising:

walls defining a housing for enclosing an interior and having an inlet port through one of the walls communicating to a supply source of viscous material and an outlet port through one of the walls communicating to a dispensing unit;

means for selectively delivering viscous material into one of the upper and lower chambers while delivering viscous material from the other of the upper and lower chambers to the dispensing unit wherein means for selectively delivering viscous material is located within the housing, and;

means for maintaining the viscous material delivered to the dispensing unit at a predetermined temperature, wherein said means for maintaining the material at a predetermined temperature includes at least one fluid inlet port and one fluid outlet port through the walls and having fluid passageways in the housing therebetween for transporting heated fluid.

2. The apparatus of claim 1, wherein said housing has a pair of inlet ports extending through the walls and connectable to the supply source, said pair of inlet ports having a common passage therebetween in the housing, said inlet ports located at proximate opposing ends of said housing.

3. The apparatus of claim 1 further comprising a directional valve to selectively communicate only one of the upper and lower chambers to the inlet port.

4. The apparatus of claim 1 further comprising a directional valve to selectively communicate only one of the upper and lower chambers to the outlet port.

5. The apparatus of claim 1, wherein the means for maintaining the viscous material at a predetermined temperature includes at least one water manifold attached to said housing.

6. The apparatus of claim 1, wherein the means for selectively delivering viscous material to the upper and lower chambers includes a first directional valve communicating with both the inlet port and the upper chamber of the cylinder and a second directional valve communicating with both the inlet port and the lower chamber of the cylinder.

7. The apparatus of claim 6, wherein only one of the first and second directional valve is open at any time.

8. The apparatus of claim 6, wherein the means for selectively delivering viscous material from the upper and lower chambers to the dispensing unit includes a third directional valve communicating with both the outlet port and the upper chamber of the cylinder and a fourth directional valve communicating with both the outlet port and the lower chamber of the cylinder.

9. The apparatus of claim 8, wherein when the first directional valve is open then only the fourth directional valve is open and the second and third directional valves are closed.

10. The apparatus of claim 8, wherein when the second and third directional valves are open then the first and fourth directional valves are closed.

11. An apparatus for delivering fluid material to a double acting metering cylinder, the metering cylinder having a fluid tight reciprocal piston forming an upper and lower expandable and contractible chamber in the cylinder, said apparatus comprising:

a housing having an inlet port communicating to a supply source of viscous material and an outlet port communicating to a dispensing unit;

means for selectively delivering viscous material into one of the upper and lower chambers while delivering viscous material from the other of the upper and lower chambers to the dispensing unit wherein means for selectively delivering viscous material is located within the housing; and a pressure transducer for monitoring the pressure of the viscous fluid in the cylinder wherein said pressure transducer is located at least partially within the housing.

12. The apparatus of claim 11 further comprising a directional valve to selectively communicate only one of the upper and lower chambers to the inlet port.

13. The apparatus of claim 11 further comprising a directional valve to selectively communicate only one of the upper and lower chambers to the outlet port.

14. The apparatus of claim 11, wherein the means for selectively delivering viscous material to the upper and lower chambers includes a first directional valve communicating with both the inlet port and the upper chamber of the cylinder and a second directional valve communicating with both the inlet port and the lower chamber of the cylinder.

15. The apparatus of claim 14, wherein only one of the first and second directional valve is open at any time.

16. The apparatus of claim 14, wherein the means for selectively delivering viscous material from the upper and lower chambers to the dispensing unit includes a third directional valve communicating with both the outlet port and the upper chamber of the cylinder and a fourth directional valve communicating with both the outlet port and the lower chamber of the cylinder.

17. The apparatus of claim 16, wherein when the first directional valve is open then only the fourth directional valve is open and the second and third directional valves are closed.

18. The apparatus of claim 16, wherein when the second and third directional valves are open then the first and fourth directional valves are closed.

19. An apparatus for delivering viscous material from a supply source to a first chamber of a double acting metering cylinder, while delivering viscous material from a second chamber of the double acting metering cylinder to a dispensing unit, the metering cylinder having a fluid tight reciprocal piston for forming the chambers and a jacket adjacent the cylinder, said apparatus comprising:

a single housing unit having an inlet port communicating to a supply source of viscous material and an outlet port communicating to a dispensing unit;

means for selectively delivering viscous material into one of the upper and lower chambers while delivering viscous material from the other of the upper and lower chambers to the dispensing unit wherein means for selectively delivering viscous material is located in the housing unit;

a directional valve located in the housing unit to selectively communicate only one of the upper and lower chambers to the inlet port; and a liquid manifold within the housing unit, said housing unit having passageways therein for delivering temperature controlled fluid to the jacket and delivering return fluid from the jacket to the liquid manifold.

* * * * *